H. MAIMIN.
FABRIC CUTTING MACHINE.
APPLICATION FILED APR. 11, 1917.
Reissued Apr. 25, 1922. 15,344.
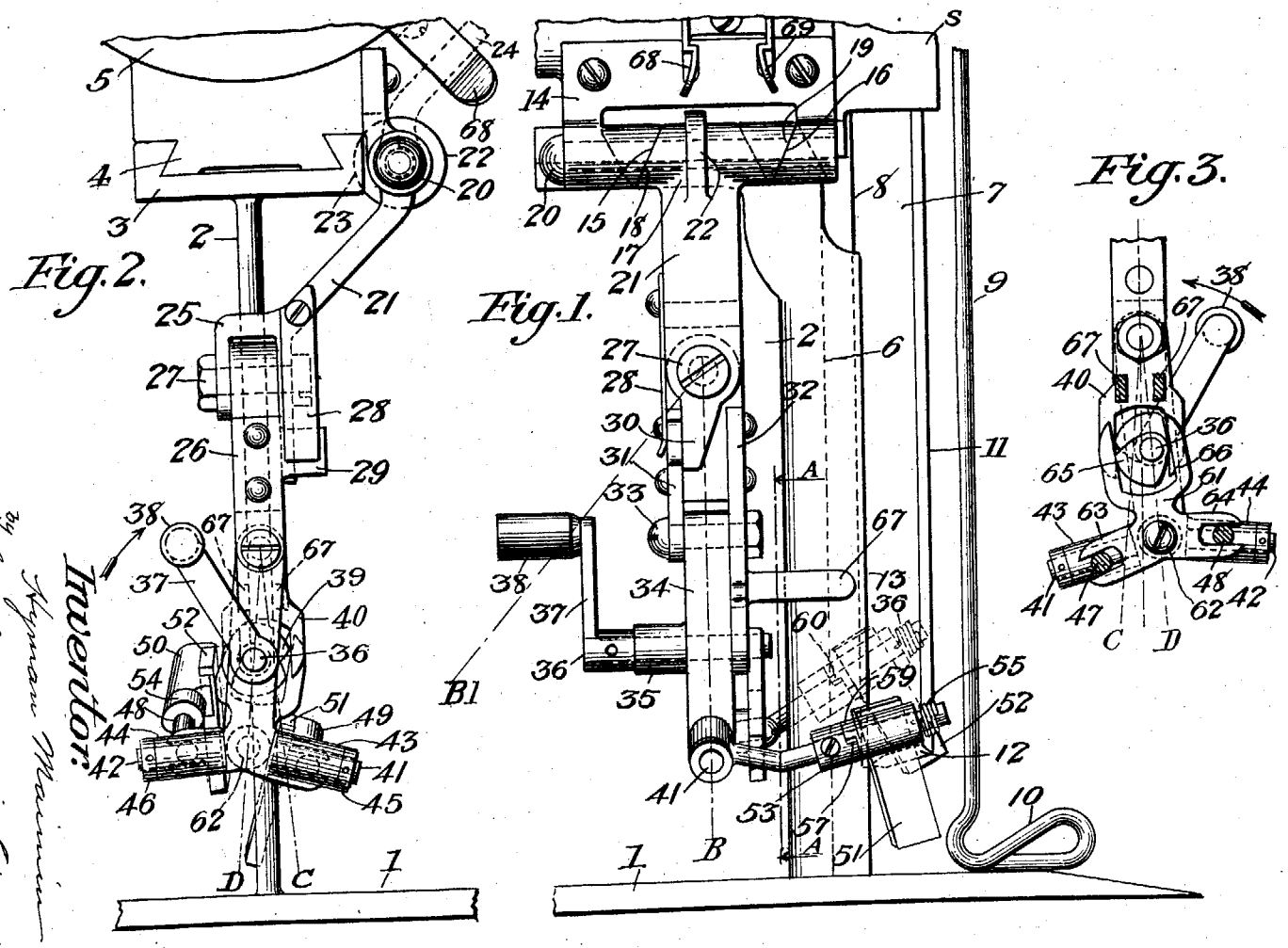
Inventor:
Hyman Maimin
by
Lemuel Davis Marvin & Edmonds
Attys.

UNITED STATES PATENT OFFICE.

HYMAN MAIMIN, OF NEW YORK, N. Y.

FABRIC-CUTTING MACHINE.

15,344. Specification of Reissued Letters Patent. Reissued Apr. 25, 1922.

Original No. 1,186,488, dated June 6, 1916, Serial No. 34,874, filed June 18, 1915. Application for reissue filed April 11, 1917. Serial No. 161,356.

*To all whom it may concern:*

Be it known that I, HYMAN MAIMIN, a citizen of the United States, and a resident of New York city, in the county of New York and State of New York, have invented certain new and useful Improvements in Fabric-Cutting Machines, of which the following is a specification.

My invention relates to improvements in fabric cutting machines of the type employing a vertically reciprocating knife sliding in a standard, which supports the driving device, usually an electric motor, and the particular mechanism for actuating the knife, together with a protecting guard and presser-foot guide mounted in front of the cutting edge of the knife and capable of a vertically adjustable movement for the purpose of bringing the presser-foot into contact with the top layer of fabric to be cut. The knife is a long flat blade of steel sliding freely in a groove in the forward edge of the standard from which it projects for about one half of its width. It has two cutting edges, the front and the lower. The front edge is known, among those skilled in the art, as the right edge, because an edge of this character is required for cutting which it does with a saw-like motion, as it is pressed against the layers of fabric. This edge is sharpened by the operator by first moving the knife guard out of the way and then by using an emery stick similar to the scythe rifle, and drawing this emery stick downward alternately along each side of the knife at an angle to form the edge. The lower knife edge which is known as the razor edge, because in cutting this edge has the action of a chisel and requires to be extremely sharp, is sharpened by being first removed from the machine and then whetted or honed on a fine grained stone or abrasive device similar to that used for razors.

The objects of my invention are, first to provide a reciprocating knife fabric cutting machine in which the lower or razor knife edge may be sharpened without removing the blade from the machine; second to provide a sharpening device for accomplishing this that will produce a uniform edge of the character required for the correct operation of the machine and third that will save the time necessary for the removal and replacement of the cutting blade.

The several objects of my invention as set forth above and the particular methods of obtaining these are now to be described and are illustrated in the accompanying drawings forming part of this specification.

Similar characters of reference denote like or corresponding parts throughout the several views in which—

Figure 1 is a partial side elevation of a cutting machine of the character described showing my invention; Fig. 2 is a partial rear elevation of the same machine, and Fig. 3 is a partial section and front elevation of the operating means for actuating the sharpening device.

Referring particularly to Fig. 1 of the drawings numeral 1 is the base plate or foot plate of the cutting machine. Rising from this plate and secured thereto is the standard 2, the upper portion 3 of which forms a support and guideway into which fits the lower portion 4 of the housing supporting the electric motor 5 and actuating mechanism of the cutting machine. The standard 2 is slotted at its forward edge to a depth corresponding to line 6 and sliding in this slot is a knife 7, the back edge 8 of which normally bears against the bottom of the slot 6. In front of this knife and for the purpose of protecting the operator is a guard 9 secured to the front of the motor housing and capable of vertical adjustment for the purpose of bringing the presser-foot and pattern guide 10 into contact with the upper layer of fabric to be cut. The forward cutting edge 11 of the knife 7 requires a rather rough or saw-like edge for cutting and this is obtained with the use of the emery stick in the manner as described. The lower edge 12 of the knife 7, when this knife is cutting, extends partially inside of the forward edge 13 of the standard so that ordinarily the knife has to be removed from the standard for sharpening this edge; however, with my invention I avoid the necessity of removing the knife by moving the entire driving mechanism and knife mounting forward in relation to the standard so as to bring the entire lower cutting edge 12 beyond the forward edge 13 of the standard 2 and thus expose the edge 12 for sharpening purposes.

The means by which I move the motor and driving mechanism in relation to the standard consists of a hinge portion 14 secured to the base 4 and having helical faced cam surfaces 15 and 16 between which faces is located a cam 17 having faces 18 and 19 shaped similarly to and adapted to co-act with the faces 15 and 16 respectively. Cam 17 is held in alinement with part 14 by a pin 20 which permits of a swinging rotation of the cam 17 and of the arm 21 preferably formed integral with 17. Cam 17 carries at its central portion a projecting collar 22 which engages in a slot 23 of the upper portion 3 of the standard 2 and serves the purpose of preventing a relative movement between the cam 17 and the standard in the direction of the axis of the pin 20. If the arm 21 is rotated from the position shown in Figs. 1 and 2 in a counter-clockwise direction through 180° it will assume the position 24 shown dotted in Fig. 2 and in this rotation will slide the motor frame 4 backward in reference to the standard and will bring the back edge 8 of the knife 7 into contact with the bottom of the slot 6.

The arm 21 carries in a forked end 25, through the pin 27, a short arm 26 capable of moving backward against spring 28 which bears against a projection 29 of a member 31 secured to arm 26. This arm 26 is restricted in its forward movement by the projection 29 coming into contact with a finger 30 secured to arm 21. At the lower end of arm 26 are secured two members 31 and 32. Between these members is pivoted at 33 a frame 34 capable of oscillation transversely and at right angles to the plane of movement of arm 26. Journaled in frame 34 at 35 is a shaft 36 secured to one end of which is a crank 37 having a handle 38 by which the shaft may be rotated. The other end of the shaft 36 carries a heart-shaped cam 39 adapted to operate between the sides of the fork 40 formed at the lower end of member 32. This cam upon its rotation causes the frame 34 to swing through the arc C, D, having about equal periods of movement and rest during one rotation of the shaft; that is, the frame moves from D to C during about 90° rotation of the shaft 36, then remains at rest during the next quarter turn, then moves from C back to D during the third quarter period and remains at rest during the fourth quarter period back to the first position mentioned.

At the lower end of the frame 34 are projecting pins 41 and 42. The axis of each of these pins is at right angles to the plane of the side of the knife edge 12 on the same side when the frame 34 is in the operative position for grinding either knife face. Mounted on these pins 41 and 42, so as to oscillate thereon, are spools 43 and 44 held on their respective pins by collars 45 and 46. Secured to these spools and extending forward are arms 47 and 48 carrying mounted on their ends and capable of oscillating thereon holders 49 and 50 to which the grinder stones 51 and 52 are secured by any of the well known methods. The holders bear against collars 53 and 54 and are held on the arms 47 and 48 and rotated toward each other by the springs 55 and 56. This rotation however is limited by shoulders 57, 57, against which similar shoulders 59 and 60 on the holders are adapted to engage respectively. The arms 47 and 48 are oppositely reciprocated by a forked lever 61 pivoted to frame 34 at 62 and having forked ends 63 and 64 engaging the arms 47 and 48 respectively. The lever 61 is oscillated back and forward through the rotation of a heart-shaped cam 65 secured to shaft 36 and engaging the forked end 66 of lever 61. The cam 65 is so timed in relation to the cam 39 that it serves to oscillate the lever 61 during those periods when the frame 34 is at rest on lines C or D. The cam 65 is further timed to commence an upward movement of arm 47 when the frame 34 has been swung to line D and the grinder stone 51 is in spring contact with the face of edge 12, thus producing by the upward and outward sweeping contact of the grinder stone with the edge 12 the correct grinding action. While stone 51 was moving upward in contact with knife-edge 12, stone 52 was moving downward out of contact with the opposite face of edge 12 and upon the continued rotation of the handle 38, after stone 52 reaches its lowest position of travel, the frame 34 will swing to position C, thereby bringing stone 52 into contact with the knife-edge 12.

For holding the arm 26 in alinement with the standard, projecting fingers 67, 67 are secured to member 32. These fingers engage opposite sides of the standard when the arm 26 and frame 34 are swung from position $B^1$ to position B, at which time the stones 51 and 52 move past the standard, one on either side of same, into their operative position as shown in Fig. 1. After the knife edge has been sharpened in the manner described, the frame 34 carrying the sharpening mechanism is moved to position $B^1$ and then the entire sharpening device is rotated to the position 24 where it is held out of the way by the spring catches 68 and 69. This upward swinging movement to position 24 retracts the knife into the standard and leaves the machine in normal operative position.

In various ways the details of construction may be modified without departing from the principle involved; the stones may be moved downwardly in contact with the knife edge and different mechanism may be used to accomplish the opposite reciprocation of these stones. Also other cam devices may be used to produce the relative movement between the operative parts of the machine and the standard through the agency of an arm swinging into a position in line with the standard, or the relative movement between the knife and the standard may be produced by the movement for bringing the stones into the operative position on either side of the knife. I do not therefore wish to be confined to the definite construction described and illustrated herein.

I claim:

1. In a fabric cutting machine provided with a standard having a groove embracing a knife which is adapted to reciprocate therein with its front and lower cutting edges exposed for cutting, the combination of means for producing a relative movement between the knife and the standard so as to expose the lower edge of the knife for sharpening and means for sharpening the edge thus exposed.

2. In a fabric cutting machine provided with a standard having a groove embracing a knife which is adapted to reciprocate therein with its front and lower cutting edges exposed for cutting, the combination of means for advancing the knife in the standard to expose the lower cutting edge of the knife for sharpening and means for sharpening the edge thus exposed.

3. In a fabric cutting machine provided with a standard having a groove embracing a knife which is adapted to reciprocate therein with its front and lower cutting edges exposed for cutting, the combination of means for advancing the knife parallel to its operative position in the standard to expose the lower cutting edge of the knife for sharpening.

4. In a fabric cutting machine provided with a standard having a groove embracing a knife which is adapted to reciprocate therein with its front and lower cutting edges exposed for cutting, the combination of means for advancing the knife partially from the standard so as to expose the lower cutting edge of the knife for sharpening and means for sharpening the edge thus exposed.

5. In a fabric cutting machine having a standard provided with a groove embracing the blade of a knife which is adapted to be reciprocated therein by a driving element supported upon the standard and in which there is a protecting element for guarding the knife, the combination of means for producing a relative movement between the driving element, knife and protecting element and the standard to expose the lower edge of the knife for sharpening.

6. In a fabric cutting machine having a standard provided with a groove embracing the blade of a knife which is adapted to be reciprocated therein by a driving element supported upon the standard and in which there is a protecting element for guarding the knife, the combination of means for advancing the driving element, knife and protecting element in relation to the standard for exposing the lower edge of the knife for sharpening.

7. In a fabric cutting machine having a standard provided with a groove embracing the blade of a knife which is adapted to be reciprocated therein by a driving element supported upon the standard and in which there is a protecting element for guarding the knife, the combination of means for moving the elements supported by the standard in relation to the standard to expose the lower edge of the knife to enable the same to be sharpened.

8. In a fabric cutting machine having a standard provided with a groove embracing the blade of a knife which is adapted to be reciprocated therein by a driving element supported upon the standard and in which there is a protecting element for guarding the knife, the combination of means for sliding forwardly the elements supported by the standard in relation to the standard for exposing the lower edge of the knife to enable the same to be sharpened.

9. In a cutting machine having a reciprocating knife, a standard provided with a groove which embraces the blade of the knife leaving the front and lower cutting edges exposed for cutting, means for producing a relative movement between the knife and the standard so as to expose the lower edge of the knife for sharpening, and sharpening means comprising two abrasive elements adapted to be brought into their operative position, one on either side of the standard from the back edge of same, for sharpening the lower edge of the knife.

10. In a cutting machine having a reciprocating knife, a standard provided with a groove which embraces the blade of the knife leaving the front and lower cutting edges exposed for cutting, means for producing a relative movement between the knife and the standard so as to expose the lower edge of the knife for sharpening, and sharpening means comprising abrasive elements adapted to be brought alternately into sliding contact with the opposite sides of the lower edge of the knife for the purpose mentioned.

11. In a cutting machine having a reciprocating knife, a standard provided with a groove which embraces the blade of the knife leaving the front and lower cutting edges exposed for cutting, means for producing a relative movement between the knife and the standard so as to expose the lower edge of the knife for sharpening, and sharpening means comprising reciprocating abrasive elements adapted to be brought alternately into sliding contact with the opposite sides of the lower edge of the knife for sharpening same.

12. In a cutting machine having a reciprocating knife, a standard provided with a groove which embraces the blade of the knife leaving the front and lower cutting edges exposed for cutting, means for producing a relative movement between the knife and the standard so as to expose the lower edge of the knife for sharpening, and sharpening means comprising reciprocating abrasive elements adapted to be brought alternately into sliding contact with the opposite sides of the lower edge of the knife during their upward movement for sharpening same.

13. A reciprocating knife fabric cutting machine comprising a base, a standard rising from the base, a knife reciprocating in the standard, a knife reciprocating motor mounted on the standard and adapted to be advanced in relation thereto, an arm on the standard adapted to be swung downwardly to a position back of the standard and in line therewith, a connection between the arm and the motor whereby the motor is advanced when the arm is lowered and sharpening means mounted on the arm and arranged to be moved forward into operative position for sharpening the lower edge of the knife.

14. In a cutting machine, a reciprocating knife, a standard having a groove which embraces the blade of the knife leaving the front and lower cutting edges exposed for cutting, means for reciprocating the knife while so embraced by the standard, said means being mounted on the standard and adapted to be advanced in relation thereto, a swinging arm carrying sharpening means, and a connection between the arm and the driving elements whereby the knife is advanced to expose its lower edge for sharpening when the swinging arm is lowered to a position which brings the sharpening means into sharpening relation with the advanced lower edge of the knife.

15. Means for sharpening the lower edge of the knife of a cutting machine of the character described, comprising abrasive elements adapted to be swept alternately over opposite sides of the lower edge of the knife at substantially right angles thereto for the purpose of sharpening the same.

16. Means for sharpening the lower edge of the knife of a cutting machine of the character described, comprising abrasive elements adapted to be reciprocated alternately over opposite sides of the lower edge of the knife at substantially right angles thereto for the purpose of sharpening the same.

17. Means for sharpening the lower edge of a vertical knife of a cutting machine of the character described, comprising reciprocating abrasive elements adapted to be swept alternately in an upward direction over the sides of the lower edge of the knife for sharpening the same.

18. Means for sharpening the lower edge of a vertical knife of a cutting machine of the character described, comprising a pair of rocking arms, stones on the swinging ends of the arms adapted to be positioned on opposite sides of the knife, and means for rocking the arms to sweep the stones upwardly and outwardly over opposite sides of the lower edge of the knife to sharpen the same.

19. Means for sharpening the lower edge of the knife of a cutting machine of the character described, comprising a pair of independently movable stone carriers, stones on the carriers adapted to be positioned on opposite sides of the knife, and means for moving the stone carriers to sweep the stones, singly and alternately, over opposite sides of the lower edge of the knife at substantially right angles thereto to sharpen the same.

20. Means for sharpening the lower edge of the knife of a cutting machine of the character described, comprising a pair of rocking-arms, stones on the swinging ends of the arms adapted to be positioned on opposite sides of the knife, and means for moving the arms from side to side and for rocking them to sweep the stones singly and alternately against the opposite sides of the lower edge of the knife to sharpen the same.

21. Means for sharpening the lower edge of a vertical knife of a cutting machine of the character described, comprising a pair of stones adapted to be arranged on opposite sides of the knife, and means for carrying and moving the stones to first move one stone laterally into sharpening relation to the lower edge of the knife and then to sweep that stone upward along the surface of the knife, then to move the stones laterally in reverse direction to bring the second stone into sharpening relation with the other side of the lower edge of the knife, and then to sweep the second stone upward along the surface of the knife, for the purpose mentioned.

22. Means for sharpening the lower edge of the knife of a cutting machine of the character described, comprising a pair of stones adapted to be positioned on opposite sides of the knife, an independently actuable carrier for each stone, and means for actuating the carriers to sweep the stones singly and alternately over opposite sides of the lower edge of the knife at substantially right angles thereto to sharpen the same, the stones being rotably mounted on their carriers and spring pressed toward sharpening contact with the knife.

23. Means for sharpening the lower edge of the knife of a cutting machine of the character described, comprising a pair of stones adapted to be positioned on opposite sides of the knife, pivotally mounted carriers for the stones, a plurality of cams and means for rotating the same, and mechanism operated by the cams to bring the stones alternately into sharpening relation with the lower edge of the knife, and to rock the stone-carriers on their pivots to sweep the stones along the surface of the knife for the purpose mentioned.

24. Means for sharpening the lower edge of the knife of a cutting machine of the character described, comprising cam mechanism, a pair of pivoted frames actuated by the cam mechanism, and a pair of stones the movements of which are controlled by the movements of the frames, one of the frames acting to move the stones from side to side to bring them alternately into sharpening relation with the edge of the knife and the other frame acting to sweep the stones singly and alternately along the surface of the knife for the purpose mentioned.

25. Means for sharpening the lower edge of the knife of a cutting machine of the character described, comprising a support, a frame pivoted on the support, a second frame pivoted on the first-mentioned frame, stone-carriers pivoted on the first frame and engaged by the second frame, stones on the stone-carriers, and rotary means for actuating both frames to move the stone-carriers from side to side to bring the stones alternately into sharpening relation with the lower edge of the knife, and for sweeping the stones singly and alternately along the surface of the knife, for the purpose mentioned.

26. Means for sharpening the lower edge of the knife of a cutting machine of the character described, comprising a support, a member pivoted on the support, a yoke fixed on the support, a rotary cam carried by the member and engaging the yoke, a yoke pivoted on the member, a second rotary cam on the member and engaging the second yoke, a pair of stone-carriers operatively connected to the second yoke, stones on the carriers, and means for rotating the cams, whereby the stone-carriers are moved from side to side to bring the stones alternately into sharpening relation with the lower edge of the knife, and the stones are singly and alternately swept along the surface of the knife, for the purpose mentioned.

27. Means for sharpening the lower edge of the knife of a cutting machine of the character described, comprising a support, a frame pivotally suspended from the support and carrying a shaft bearing, a shaft in the bearing, a cam on the shaft, a relatively stationary yoke engaged by the cam, a pair of stone-carriers pivoted on the frame, stones on the carriers, a second cam on the shaft, and a pivoted member on the frame actuated by the second cam for rocking the stone-carriers on their pivots, whereby the stone-carriers are moved from side to side to bring the stones alternately into sharpening relation with the lower edge of the knife, and the stones are singly and alternately swept along the surface of the knife, for the purpose mentioned.

In testimony whereof I affix my signature.

HYMAN MAIMIN.